United States Patent Office

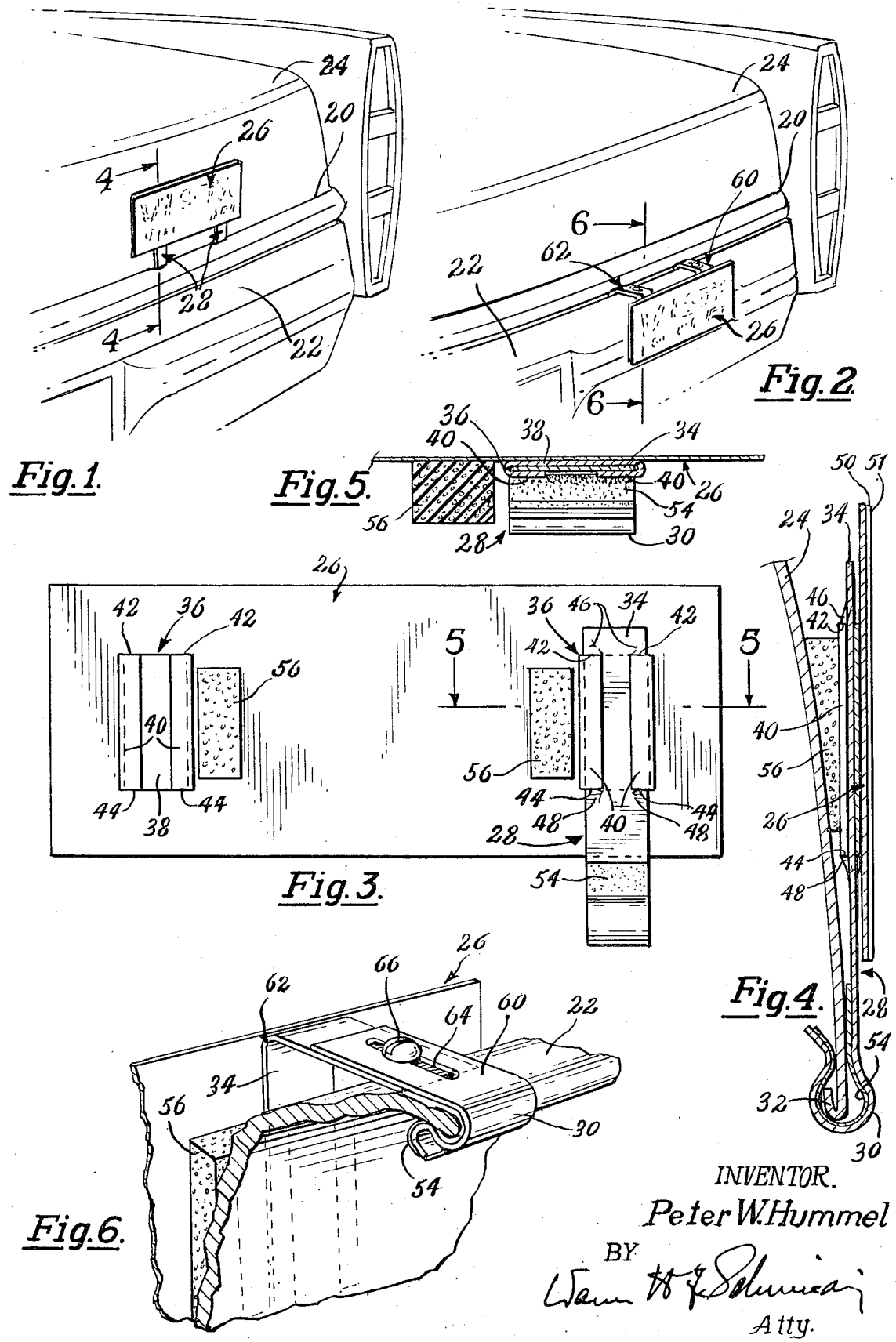

3,509,653
Patented May 5, 1970

3,509,653
REMOVABLE DISPLAY PLATES FOR AUTOMOBILE
Peter W. Hummel, 1205 N. Santa Fe, Space 77,
Vista, Calif. 92083
Filed Aug. 2, 1968, Ser. No. 749,881
Int. Cl. G09f 7/18, 3/18
U.S. Cl. 40—129                     4 Claims

ABSTRACT OF THE DISCLOSURE

A removable display device, which is deatchable, connected to either the bumper or trunk lid of an automobile. It includes a display plate. A padding is disposed between the rear of the plate and the bumper or trunk lid to prevent rattling and marring of the bumper or trunk lid.

BACKGROUND OF THE INVENTION

Field of the invention

The invention is directed to detachable display devices which are applied to automobiles.

Description of the prior art

A search revealed complicated mechanisms for attaching display devices to automobiles. Such are included in the following patents: Pat. Nos. 2,431,108, Carleton et al., Nov. 18, 1947; 2,494,179, King, Jan. 10, 1950; 2,675,983 King, Apr. 20, 1954; 3,161,973, Hastings, Dec. 22, 1964. Each of these structures is relatively complicated and expensive to manufacture.

SUMMARY OF THE INVENTION

This display pate is held in place on the bumper or trunk lid by a resilient strap, the strap having a hook section and a section for removably attaching the strap to the plate. The padding is attached to the rear face of the plate.

Other features and the advantages of the present invention will be apparent from the following description. reference being had to the accompanying drawing wherein a preferred embodiment of the invention is illustrated.

BRIEF DESCRIPTION OF THE DRAWING

FIG. 1 is a fragmentary perspective view of the rear of an automobile showing the improved removable display device attached to the trunk lid of the automobile;

FIG. 2 is a view similar to FIG. 1, but showing the display device connected to the bumper instead of the trunk;

FIG. 3 is a rear view of a plate and showing one of the two fastening straps;

FIG. 4 is a sectional view taken along line 4—4 of FIG. 3, but on a larger scale and showing an additional plate and a decalcomania or paper sheet attached to the latter plate;

FIG. 5 is a sectional view taken along line 5—5 of FIG. 3, but on a larger scale; and FIG. 6 is a fragmentary perspective view looking in the direction of arrows 6—6 of FIG. 2, but on a larger scale, part of the bumper being shown in section

DESCRIPTION OF THE PREFERRED EMBODIMENT

The rear end 20 of the automobile includes a bumper 22 and a trunk lid 24. The display plate 26 is removably attached to the bumper or trunk lid by straps.

One of the two straps for attaching the plate to the trunk lid is shown at 28. These straps are formed of resilient and flexible material such as spring steel. Each strap includes a hook section 30 which receives the lowest end 32 of the trunk lid, and being resilient and flexible, it is held in position The strap 28 includes a section 34 which extends through one of the two receivers 36 on the rear of the plate 26. Each of the receivers includes a back 38 and connected wings or flanges 40 which are spaced from the back and extend toward one another as is more clearly shown in FIGS. 3 and 5. The section 34 of the strap extends through the space between the back 38 and the wings 40. The upper and lower edges 42 and 44, respectively, of the receiver wings 40 form shoulders and the section 34 of the strap is provided with outwardly bent ears 46 and 48 forming shoulders which complement and abut, respectively, the edges 42 and 44 on the wings. The straps 28 are thereby held in position. The strap being resilient, the upper ears 46 can be depressed sufficiently to pass through the space between the back 38 and wings 40 of the receiver 36. Likewise the ears can be depressed to remove the strap from the receiver.

As is more clearly shown in FIG. 4, the plate 26 can be considered the "main plate" and if larger display is desirable, an ancillary plate 50 can be attached to the main plate in any suitable manner as by screws, not shown. The plate 50 has a decalcomania or a paper sheet 52 or other form of printed matter fixed thereto.

Should the strap be formed of, for example, a material which is apt to scratch the paint on the trunk lid, then in that event a thin strip of padding material 54 is placed in the hook section 30. Paddings 56 of flexible material are attached to the rear of plate 26 to prevent rattling and prevent marring of the trunk lid.

Referring now to the strap embodiment shown in FIGS. 2 and 6, it includes two pieces 60 and 62, each being formed of flexible and resilient material. The piece 60 is equivalent to the hook section 30 of strap 28 and is hooked about the front edge of the bumper 22, and due to its resiliency is held in position on the bumper. The piece 62 is equivalent to the plate fastening section 34 of strap 28 and, therefore, attaches the plate to the straps. Either the piece 60 or the piece 62 is provided with an elongated slot 64 or both may be provided with such slot. The pieces are adjustably fastened to one another in any suitable manner as by a bolt 66 and a nut (not shown), the bolt extending through the slot or slots, the head of the bolt and the nut having larger diameters than the width of the slot. The pieces 60 and 62 being adjustable relative to one another provides for fastening the plate to bumpers having different widths.

From the foregoing it is apparent that I have provided simple and inexpensive, removable display devices for attachment to automobiles. Also, I have provided for preventing rattling and marring of those parts of the automobile to which the display device is attached. Thus, the fastening mechanism can be formed of a sturdy material such as steel.

I claim:
1. A removable display device for an automobile comprising in combination:
   (A) a plate having a front face and a rear face;
   (B) means for attaching the plate to the bumper or the trunk lid of an automobile, said means including:
      (1) a strap having:
         (a) a flexible, resilient section at one end thereof forming a hook for resiliently fastening the strap to the bumper or the trunk lid,
         (b) a section for removably attaching the strap to the rear face of the plate,
         (c) a padding carried by the rear face of plate.
2. A removable display device as defined in claim 1, characterized in that the strap hook section and the second mentioned section are separate pieces, one of said pieces having a longitudinally extending slot, and further characterized to include:
  (d) means extending through the slot and connected with the other piece for fastening the pieces in adjusted position relative to one another.

3. A removable display device as defined in claim 1, characterized in that the means (B) for attaching the plate includes:
  (2) a receiver attached to the rear face of the plate for receiving the section (b) of the strap.

4. A removable display device as defined in claim 3, characterized in that the receiver (B) (2) includes:
  (a) shoulders at opposite ends thereof, and further characterized in that the strap section (b) includes:
    (1) ears forming shoulders abutting the shoulders on the receiver.

References Cited

UNITED STATES PATENTS

| | | |
|---|---|---|
| 1,681,595 | 8/1928 | Ray. |
| 2,074,250 | 3/1937 | Bone. |
| 2,826,841 | 3/1958 | Hoofer _____ 40—11 |
| 3,060,605 | 10/1962 | Flack. |

EUGENE R. CAPOZIO, Primary Examiner

W. J. CONTRERAS, Assistant Examiner

U.S. Cl. X.R.

40—10, 11